(12) United States Patent
Crutchley et al.

(10) Patent No.: US 9,095,998 B2
(45) Date of Patent: Aug. 4, 2015

(54) CONTAINER AND APPLICATOR ARRANGEMENT FOR A COSMETIC PRODUCT, AND ASSOCIATED METHOD OF MANUFACTURE

(75) Inventors: Edward Crutchley, Tunbridge Wells (GB); Marc Bland, Sainte Menehould (FR); Victor Ramos, Rambouillet (FR); Nicholas Thorne, Seyssins (FR)

(73) Assignee: ALBEA SERVICES, Gennevilliers (FR)

( * ) Notice: Subject to any disclaimer, the term of this patent is extended or adjusted under 35 U.S.C. 154(b) by 948 days.

(21) Appl. No.: 13/141,764

(22) PCT Filed: Dec. 24, 2009

(86) PCT No.: PCT/EP2009/067910
§ 371 (c)(1),
(2), (4) Date: Aug. 24, 2011

(87) PCT Pub. No.: WO2010/072835
PCT Pub. Date: Jul. 1, 2010

(65) Prior Publication Data
US 2011/0299910 A1    Dec. 8, 2011

(30) Foreign Application Priority Data
Dec. 24, 2008    (EP) .................................... 08356157

(51) Int. Cl.
*A45D 34/04*    (2006.01)
*B29C 45/00*    (2006.01)
(Continued)

(52) U.S. Cl.
CPC .......... *B29C 45/0081* (2013.01); *A45D 34/042* (2013.01); *A45D 40/262* (2013.01);
(Continued)

(58) Field of Classification Search
CPC . A45D 34/042; A45D 34/045; A45D 34/046; A45D 40/262; A45D 40/265; A45D 40/267
USPC .......................... 401/118, 121, 122, 126–129
See application file for complete search history.

(56) References Cited

U.S. PATENT DOCUMENTS 4,732,287 A * 3/1988 Bennett ......................... 401/129
5,180,242 A    1/1993 De Laforcade
(Continued)

FOREIGN PATENT DOCUMENTS

GB    1043970 A    9/1966
JP    09188350 A    7/1997
(Continued)

OTHER PUBLICATIONS

International Search Report and Written Opinion mailed Apr. 7, 2010 (PCT/EP2009/067910); ISA/EP.

*Primary Examiner* — David Walczak
*Assistant Examiner* — Bradley Oliver
(74) *Attorney, Agent, or Firm* — Banner & Witcoff, Ltd.

(57) ABSTRACT

According to a first aspect of the invention there is provided a method of manufacturing an applicator and container arrangement comprising molding an insert from a first material, placing the molded insert into a mold, molding an outer structure from a second material over the molded insert, the second material having limited adhesion to the first material, the outer structure defining a handle portion and a shoulder portion, and having a weakened area between the handle portion and the shoulder portion, providing a body portion in a material compatible with the second material so as to ensure adherence to the shoulder portion of the outer structure, and assembling the outer structure, including the insert, and the body portion. The invention extends to a container and applicator arrangement made in accordance with the method.

18 Claims, 4 Drawing Sheets

(51) Int. Cl.
  *B29C 45/16* (2006.01)
  *B65D 1/09* (2006.01)
  *B65D 51/32* (2006.01)
  *A45D 40/26* (2006.01)
  *B29L 31/00* (2006.01)

(52) U.S. Cl.
  CPC ............... *B29C 45/16* (2013.01); *B65D 1/095* (2013.01); *B65D 51/32* (2013.01); *A45D 34/046* (2013.01); *A45D 40/267* (2013.01); *B29C 2045/1601* (2013.01); *B29L 2031/712* (2013.01)

(56) References Cited

U.S. PATENT DOCUMENTS

| | | | |
|---|---|---|---|
| 5,826,600 A * | 10/1998 | Rowe et al. | 401/129 |
| 6,039,487 A * | 3/2000 | Kristiansen | 401/126 |
| 6,413,087 B1 * | 7/2002 | Petrich et al. | 401/202 |
| 6,419,414 B1 * | 7/2002 | Broyles et al. | 401/132 |
| 6,502,584 B1 * | 1/2003 | Fordham | 401/122 |
| 7,112,062 B2 * | 9/2006 | Lee | 401/126 |
| 8,235,617 B2 * | 8/2012 | Peck et al. | 401/126 |
| 2006/0239757 A1 * | 10/2006 | Giniger | 401/126 |
| 2007/0079844 A1 | 4/2007 | Dieudonat et al. | |
| 2012/0217177 A1 * | 8/2012 | Slokovic et al. | 206/209 |

FOREIGN PATENT DOCUMENTS

| | | |
|---|---|---|
| WO | 03/070053 A | 8/2003 |
| WO | 2005/028329 A | 3/2005 |
| WO | 2008/031766 A | 3/2008 |
| WO | 2008/089927 A | 7/2008 |

* cited by examiner

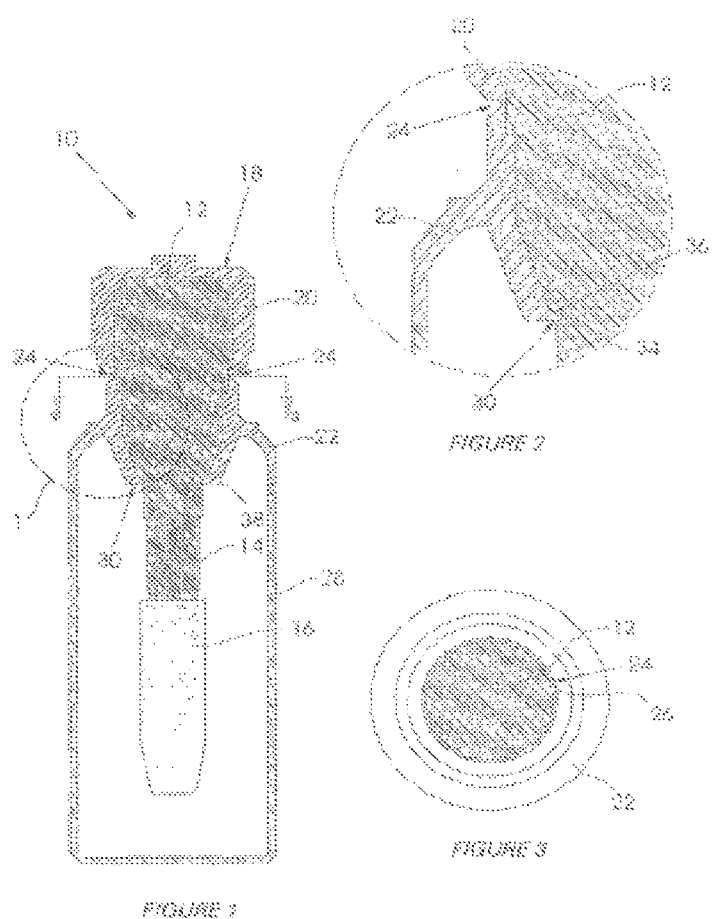

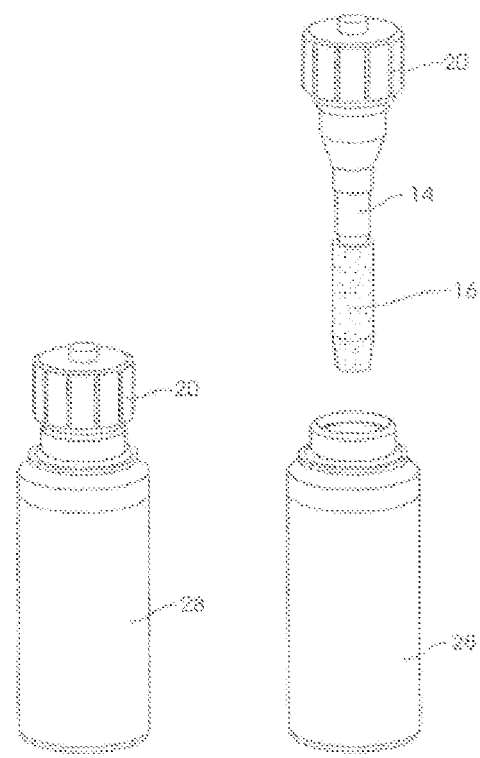

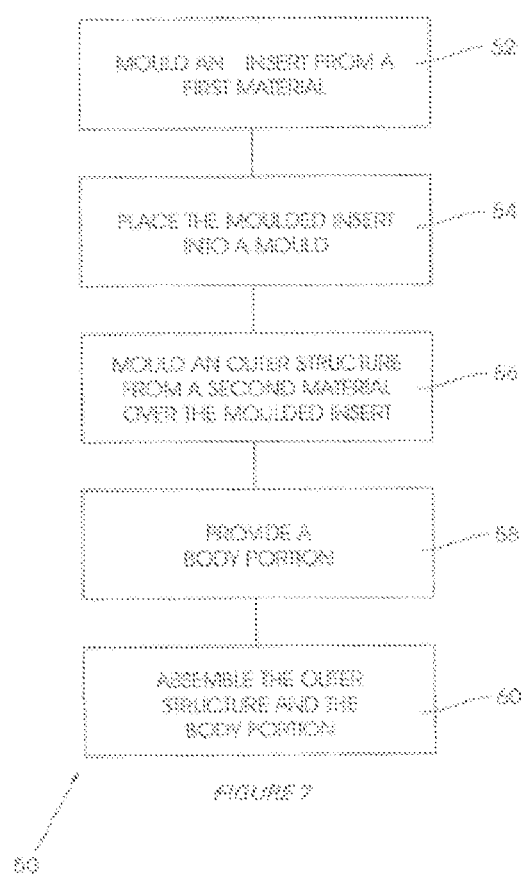

CONTAINER AND APPLICATOR ARRANGEMENT FOR A COSMETIC PRODUCT, AND ASSOCIATED METHOD OF MANUFACTURE

CROSS-REFERENCE TO RELATED APPLICATIONS/PRIORITY CLAIM

The present application is a U.S. National Phase filing of International Application No. PCT/EP2009/067910 filed on Dec. 24, 2009, designating the United States of America and claiming priority to European Patent Application No. 08356157.1, filed on Dec. 24, 2008, both of which applications the present application claims priority to and the benefit of, and both of which applications are incorporated by reference herein in their entireties.

FIELD OF THE INVENTION

This invention relates to a container and applicator arrangement for a cosmetic product and a method of manufacturing therefor.

BACKGROUND OF THE INVENTION

There are several issues associated with a conventional mascara package that render it expensive and difficult to produce:

For example, each mascara package typically entails a plurality of manufacturing steps, namely moulding a wiper, moulding a cap, possibly moulding a stem, moulding a container, possibly assembling the cap and stem, assembling the wiper and container, possibly manufacturing a separate applicator (such as a wire brush) and assembling this applicator to the stem and then, finally, assembling the cap and stem, and container and wiper. Clearly, such a process is cumbersome, time-consuming and highly inefficient. In particular manufacturing step, a wiper has to be manufactured separately and assembled to the container. The wiper has to correspond and conform very carefully to the dimensions of the container and the diameter of the applicator stem inserted through the wiper. Once the package has been used, the assembled wiper has a tendency to separate from the container, due to lubrication and infiltration of the mascara.

In addition, these containers are typically manufactured using injection blow moulding, which is a relatively slow process with between 50-60 of these containers being able to be made per minute.

There exists therefore a need for a container and applicator arrangement for a cosmetic product that is relatively inexpensive, reusable and quick to manufacture.

SUMMARY OF THE INVENTION

According to a first aspect of the invention there is provided a method of manufacturing an applicator and container arrangement comprising;
    moulding an insert from a first material;
    placing the moulded Insert into a mould;
    moulding an outer structure from a second material over the moulded insert, the second material having limited adhesion to the first material, the outer structure defining a handle portion and a shoulder portion, and having a weakened area between the handle portion and the shoulder portion;
    providing a body portion in a material compatible with the second material so as to ensure adherence to the shoulder portion of the outer structure; and
    assembling the outer structure, including the insert, and the body portion.

In an example embodiment, the step of assembling the outer structure and the body portion comprises pre-inserting the body portion in the mould and moulding the outer structure over the body portion and insert.

In an example embodiment, the step of assembling the outer structure and the body portion comprises securing the outer structure to the body portion using one of press-fitting, welding, spin-welding and gluing.

In an example embodiment, the steps of providing the body portion and assembling the outer structure and the body portion comprises injection-moulding the body portion integrally with the outer structure.

In an example embodiment, the method further comprises pre-fitting an applicator portion to the insert.

In an example embodiment, the applicator portion is a twisted-wire brush, with the method further comprising pre-heating the twisted-wire brush to ensure a weld to the insert, and inserting the twisted-wire brush into the insert.

In an example embodiment, the step of moulding the insert includes the step of integrally moulding an applicator portion with the insert.

In an example embodiment, the first material is polyoxymethylene (POM) and the second material is a high-density polyethylene (HDPE).

In an example embodiment, the weakened area is defined by a plurality of break-off ribs, with the step of moulding the outer structure comprising moulding the plurality of break-off ribs at the junction between the handle portion and shoulder portion.

According to a second aspect of the invention there is provided a container and applicator arrangement for a cosmetic product, including:
    an insert made of a first material including an elongate stem having a proximal end and a distal end having an applicator portion;
    an outer structure made of a second material having limited adhesion to the first material, the outer structure accommodating the insert so as to define a unitary structure, the outer structure defining a handle portion and a shoulder portion, and having a weakened area between the handle portion and the shoulder portion to enable the handle portion to be separated from the shoulder portion; and
    a body portion extending from the shoulder portion of the outer structure for accommodating the cosmetic product.

In an example embodiment, the applicator portion is integrally moulded with the elongate stem.

In an example embodiment, the applicator portion is fitted to the elongate stem.

In an example embodiment, the applicator portion is selected from a group comprising a twisted wire brush, a plastic applicator, a flocked applicator and a lip gloss brush.

In an example embodiment, the weakened area is defined by a plurality of break-off ribs.

In an example embodiment, the handle portion can be separated from the shoulder portion with an opening force of between 10 N.cm and 30 N.cm.

In an example embodiment, the opening force is approximately 20 N.cm.

In an example embodiment, the body portion is made from a multi-layer co-extruded tube sleeve.

In an example embodiment, at least one layer or the tube sleeve is PCR.

In an example embodiment, the first material is polyoxymethylene (POM), and the second material is a polyethylene.

In an example embodiment, the first material is a polyethylene and the second material is polypropylene (PP) including a slip additive.

In an example embodiment, the first material is a copolyester and the second material is a polyethylene.

In an example embodiment, the polyethylene is either high-density polyethylene (HDPE) or low-density polyethylene (LDPE).

In an example embodiment, the copolyester is either PCTA, PCTG or PETG.

In an example embodiment, the outer pad includes an internal integrally moulded wiper element that snugly accommodates the insert. Advantageously, moulding the wiper as part of the shoulder of the container, and with the applicator already in place, the number of manufacturing operations is reduced, and the wiper conforms adequately to the dimensions of the applicator stem.

In an example embodiment, the wiper element comprises a lip for engaging an indent defined on the insert so as to sealingly engage the insert in a snap-fit when the insert is fitted to the outer structure.

In an example embodiment, the insert includes a screw thread for engaging a complementary screw thread defined on an internal portion of the shoulder portion.

BRIEF DESCRIPTION OF THE DRAWINGS

FIG. 1 shows a cross-sectional side view of a container and applicator arrangement for a cosmetic product, according to an example embodiment;

FIG. 2 shows a detailed view of the area demarcated by numeral "1" in FIG. 1;

FIG. 3 shows a cross-section top view along line 3-3 in FIG. 1;

FIG. 5 shows a perspective view of the container and applicator arrangement shown in FIG. 1 in a closed, sealed configuration;

FIG. 6 shows a perspective view of the container and applicator arrangement after the handle portion has been separated from the shoulder portion; and FIG. 7 shows a block diagram representing a method of manufacturing an applicator arrangement and container, according to an example embodiment.

DESCRIPTION OF PREFERRED EMBODIMENTS

Figure 4:
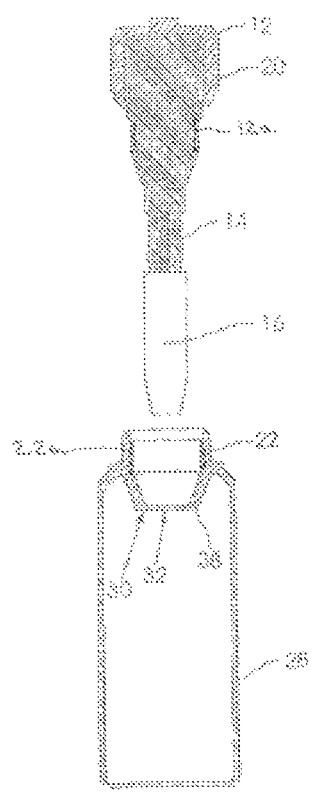
FIG. 4 shows a cross-sectional side view of the container and applicator arrangement shown in FIG. 1 after separation of a handle portion of an outer structure from a shoulder portion of the outer structure.

Referring first to FIGS. 1 to 6, a container and applicator arrangement 10 for a cosmetic product is shown. The container and applicator arrangement 10 includes an insert 12 made of a first material including an elongate stem 14 having a proximal end and a distal end having an applicator portion 16.

In an example embodiment, the applicator portion 16 is integrally moulded with the elongate stem 14. Alternatively, as shown best in FIGS. 1, 4 and 6, the applicator portion 16 is fitted to the elongate stem 14. In an example embodiment, the applicator portion 18 is selected from a group comprising a twisted wire brush, a plastic applicator, a flocked applicator and a lip brush.

The container and applicator arrangement 10 further comprises an outer structure 18 made of a second material having limited adhesion to the first material, the outer structure 18 encapsulating the insert 12 so as to define a unitary structure. In an example embodiment, the first material is polyoxymethylene (POM) and the second material is a polyethylene, either high-density polyethylene (HDPE) or low-density polyethylene (LDPE). Alternatively, the first material is a polyethylene, again either HDPE or LDPE, and the second material is polypropylene (PP) including a slip additive. As a further alternative, the first material is a copolyester and the second material is a polyethylene, again either HDPE or LDPE. In this last version, the copolyester is either PCTG, a glycol-modified copolyester of PCT (polycyclohexylene dimethylene terephthalate), PETG, a glycol-modified copolyester of PET (polyethylene terephthalate), and PCTA, an acid-modified copolyester of PCT (polycyclohexylene dimethylene terephthalate).

The outer structure 13 defines a handle portion 20 and a shoulder portion 22, and has a weakened area 24 between the handle portion 20 and the shoulder portion 22 to enable the handle portion 20 to be separated from the shoulder portion. Conveniently, as best shown in FIG. 3, the weakened area 24 is defined by a plurality of frangible, break-off ribs 26. The handle portion 20 can thus be relatively easily separated from the shoulder portion 22 using a twisting action with an opening force of between 10 N.cm and 30 N.cm, and preferably approximately 20 N.cm. Once separated, the body of the insert 12 above the break-off point 26 remains intact with the outer structure 18, and in particular the handle portion 20 of the outer structure 18. Thus, after shearing the break-off points 26, the handle portion 20, the insert 12, and the applicator components 14, 16 separate from the shoulder portion 22 of the outer structure 18, as best shown in FIGS. 4 and 6. Before separation, the insert material and the outer structure material remain together, and form a seal, with a low level of adhesion between the two materials; however, after separation the insert 12 and the applicator components 14, 16 can be relatively easily removed from the shoulder portion 22.

Advantageously, the frangible ribs 28 define a tamper-proof feature, so that once broken, the arrangement 10 has clearly been tampered with, which is clearly important for customers receiving a mascara container embodying the container and applicator arrangement 10.

For example, in an 8 mm version, the break-off points 26, moulded in HDPE, when consisting of nine triangular channels of cross-section 0.02 to 0.03 $mm^2$, require a break-off torque of around 10 N.cm, to which has to be added the same amount to separate the HDPE and POM surfaces, giving a total of 20 N.cm. This is considered to be a perfectly acceptable torque for a final consumer. The weakened area 24 may be defined by between 3 and 15 small channels, or ribs 26, of the order of 0.3 mm in thickness, typically 0.2 to 0.5 mm in thickness by 0.5 mm in width, and preferably between 0.3 in thickness and 0.9 mm in width. Alternatively, thicker channels, or ribs 26, may be moulded, of same width, and machining down the channels, or ribs, in order to arrive at a range of 0.2 to 0.5 mm. In any event, the accuracy of the break-off points 26 is important so that the break-off torque remains controlled.

The container and applicator arrangement 10 further comprises a body portion 28, typically in the form of a sleeve, extending from the shoulder portion 22 of the outer structure 18 for accommodating the cosmetic product, such as mascara. In an example embodiment, the body portion 28 is made from a multi-layer co-extruded tube sleeve 28, wherein at least one layer of the tube sleeve is post consumer recycled (PCR). For applicators where the cosmetic product has a tendency to migrate, in particular, the body portion tube 28 can be manufactured in a barrier material, such as a multi-layer co-extruded sleeve. In addition, where there may be a desire to recycle the container and applicator arrangement 10, the inner co-extruded layer can be made from recycled material.

The tubular body portion 28 can be decorated either before or after fitment to the shoulder portion 22, or it can be labeled when the final product is filled.

Although the body portion 28 in the figures takes the form of a rigid body, a flexible tube or sachet may also be used.

As best shown in FIGS. 1, 2 and 4, the outer structure 18 includes an internal integrally moulded wiper element 30, enclosed by the shoulder portion 22, the wiper element 30 defining an aperture 32 for snugly accommodating the insert 12. In particular, the wiper element 30 may comprise a lip 34 for engaging an indent 36 defined on the insert 12 so as to engage the insert 12 in a sealing snap-fit when the insert 12 is fitted to the shoulder portion 22 of the outer structure 18. The wiper element 30 ensures that, when the insert 12 and applicator portion 16 are removed, the stem 14 holding the applicator portion 16 is wiped clean, and the applicator portion 16 is also wiped in order to remove excess mascara product that has gathered on the applicator portion 16.

If the wiper element 30 internal diameter needs to be slightly less than the stem 14, so as to improve wiping of the stem 14, and the applicator 16, a gorge can be included on the stem 14 to allow the injected wiper 30 to have a smaller opening than the diameter of the stem 14.

The insert 12 may include a screw thread 12a for engaging a complementary screw thread 22a defined on an internal portion 38 of the shoulder portion 22. Thus, if desired, a screw thread 12a may be included in the insert 12 in order to provide a more positive re-closure. With a screw thread 12a, instead of clicking the insert 12 and applicator portion 16 back into position with a movement more or less in line with the axis of the body portion 28, as described in the previous paragraph, the holding force between the insert 12 and handle portion 20 is assured by a screw thread 12a on the insert 12, and, if required, a final click in order to ensure a definitive stop position.

Turning now to FIG. 7, a method 50 of manufacturing an applicator and container arrangement is shown. The method 50 comprises moulding an insert from a first material, as indicated by block 52. The method 50 further comprises placing the moulded insert into a mould, as indicated by block 54. The method 50 further comprises moulding an outer structure from a second material over me moulded insert, as indicated by block 56. Since the order structure is moulded over the insert, a perfect seal is provided between these 2 components.

As described above, the outer structure defines a handle portion and a shoulder portion. A weakened area is defined between the handle portion and the shoulder portion so that the handle portion may be separated, with relatively little effort, from the shoulder portion. As explained above, the second material has limited adhesion to the first material, which facilitates the separation of the insert from the outer structure, and in particular the shoulder portion of the outer structure. In an example embodiment, the first material is polyoxymethylene (POM) and the second material is high-density polyethylene (HDPE). Advantageously, both of these materials also offer good chemical resistance to cosmetic products, and are chemically inert, and so are unlikely to react with the cosmetic product.

In an example embodiment, the weakened area is defined by a plurality of break-off ribs, with the step of moulding the outer structure comprising moulding the plurality of break-off ribs at the junction between the handle portion and shoulder portion.

The method 50 further comprises providing a body portion in a material compatible with the second material so as to ensure adherence to the shoulder portion of the outer structure, as indicated by block 58.

The method 50 concludes by assembling the outer structure, including the insert, and the body portion, as indicated by block 60. In an example embodiment, the step of assembling the outer structure and the body portion comprises pre-inserting the body portion in the mould and moulding in situ the outer structure over the body portion and insert. Alternatively, the steps of providing the body portion and assembling the outer structure and the body portion comprises injection-moulding the body portion integrally with the outer structure, thereby reducing the overall number of required operations. As a further alternative, the step of assembling the outer structure and the body portion comprises securing the outer structure to the body portion using one of press-fitting, welding, spin-welding and gluing.

In an example embodiment, the method 50 further comprises pre-fitting an applicator portion to the insert. In an example embodiment, the applicator portion is a twisted-wire brush, with the method 50 further comprising pre-heating the twisted-wire brush to ensure a weld to the insert, and inserting the twisted-wire brush into the insert. In an example embodiment, the step of moulding the insert includes the step of integrally moulding an applicator portion with the insert.

The present invention can be particularly advantageous for manufacturing mascara samplers. Mascara samplers are typically mini-versions of regular-sized mascaras. However, since mascara samplers need to operate in substantially the same way as regular-sized mascaras, these mascara samplers tend to be expensive to manufacture and it is therefore generally not economically viable to give away samplers to prospective customers.

It is therefore an object of the present invention to provide a container and applicator arrangement for a cosmetic product that is relatively inexpensive, reusable and mimics the regular-sized mascaras in operation and application quality. In addition, since the arrangement only comprises 3 components, namely the insert, the outer structure (including the shoulder, seal, wiper and applicator portion) and the tubular body portion, the overall number of steps required to manufacture the arrangement is kept to a minimum.

To summarize, the invention concern:
  item 1: a method of manufacturing an applicator and container arrangement comprising:
    moulding an insert from a first material;
    placing the moulded insert into a mould;
    moulding an outer structure from a second material over the moulded insert, the second material having limited adhesion to the first material, the outer structure defining a handle portion and a shoulder portion, and having a weakened area between the handle portion and the shoulder portion;
    providing a body portion in a material compatible with the second material so as to ensure adherence to the shoulder portion of the outer structure; and
    assembling the outer structure, including the insert, and the body portion.

item 2 a method according to item 1, wherein the step of assembling the outer structure and the body portion comprises pre-inserting the body portion in the mould and moulding the outer structure over the body portion and insert.

item 3: a method according to item 1, wherein the step of assembling the outer structure and the body portion comprises securing the outer structure to the body portion using one of press-fitting, welding, spin-welding and gluing.

item 4: a method according to item 1, wherein the steps of providing the body portion and assembling the outer structure and the body portion comprises injection-moulding the body portion integrally with the outer structure.

item 5: a method according to item 1, which further comprises pre-fitting an applicator portion to the insert.

item 6: a method according to item 5, wherein the applicator portion is a twisted-wire brush, with the method further comprising predicating the twisted-wire brush to ensure a weld to the insert, and inserting the twisted-wire brush into the insert.

item 7: a method according to item 1, wherein the step of moulding the insert includes the step of integrally moulding an applicator portion with the insert.

item 8: a method according to item 1, wherein the first material is polyoxymethylene (POM) and the second material is high-density polyethylene (HDPE).

item 9: a method according to item 1, wherein the weakened area is defined by a plurality of break-off ribs, with the step of moulding the outer structure comprising moulding the plurality of break-off ribs at the junction between the handle portion and shoulder portion.

item 10: a container and applicator arrangement for a cosmetic product, including:
  an insert made of a first material including an elongate stem having a proximal end and a distal end having an applicator portion;
  an outer structure made of a second material having limited adhesion to the first material, the outer structure accommodating the insert so as to define a unitary structure, the outer structure defining a handle portion and a shoulder portion, and having a weakened area between the handle portion and the shoulder portion to enable the handle portion to be separated from the shoulder portion; and
  a body portion extending from the shoulder portion of the outer structure for accommodating the cosmetic product.

item 11: a container and applicator arrangement according to item 10, wherein the applicator portion is integrally moulded with the elongate stem.

item 12: a container and applicator arrangement according to item 10, wherein the applicator portion is fitted to the elongate stem, item 13: a container and applicator arrangement according to item 12, wherein the applicator portion is selected from a group comprising a twisted wire brush, a plastic applicator and a flocked applicator.

item 14: a container and applicator arrangement according to item 10, wherein the weakened area is defined by a plurality of break-off ribs.

item 15: a container and applicator arrangement according to item 10, wherein the handle portion can be separated from the shoulder portion with an opening force of between 10 N.cm and 30 N.cm.

item 16: a container and applicator arrangement according to item 15, wherein the opening force is approximately 20 N.cm.

item 17: a container and applicator arrangement according to item 10, wherein the body portion is made from a multi-layer co-extruded tube sleeve, item 18: a container and applicator arrangement according to item 17, wherein at least one layer of the tube sleeve is PCR.

item 19: a container and applicator arrangement according to item 10, wherein the first material is polyoxymethylene (POM) and the second material is a polyethylene (PET).

item 20: a container and applicator arrangement according to item 10, wherein the first material is a polyethylene and the second material is polypropylene (PP) including a slip additive.

item 21: a container and applicator arrangement according to item 10, wherein the first material is a copolyester and the second material is a polyethylene.

item 22: a container and applicator arrangement according to any one of items 17 to 19, wherein the polyethylene is either high-density polyethylene (HDPE) or low-density polyethylene (LDPE).

item 23: a container and applicator arrangement according to item 21, wherein the copolyester is either PCTA, PCTG or PETG.

item 24: a container and applicator arrangement according to item 10, wherein the outer part includes an internal integrally moulded wiper element that snugly accommodates the insert.

item 25: a container and applicator arrangement according to item 24, wherein the wiper element comprises a lip for engaging an indent defined on the insert so as to sealingly engage the insert in a snap-fit when the insert is fitted to the outer structure.

item 26: a container and applicator arrangement according to item 10, wherein the insert includes a screw thread for engaging a complementary screw thread defined on an internal portion of the shoulder portion.

and item 27: a container and applicator arrangement according to item 10, wherein the container is a mascara sampler.

The invention claimed is:

1. A method of manufacturing an applicator and container arrangement comprising:
  moulding an insert from a first material;
  placing the moulded insert into a mould;
  moulding an outer structure from a second material over the moulded insert, the outer structure defining a handle portion and a shoulder portion, and having a weakened area between the handle portion and the shoulder portion;
  providing a body portion in a material compatible with the second material so as to ensure adherence to the shoulder portion of the outer structure; and
  assembling the outer structure, including the insert, and the body portion.

2. A method as claimed in claim 1, wherein the step of assembling the outer structure and the body portion comprises pre-inserting the body portion in the mould and moulding the outer structure over the body portion and insert.

3. A method as claimed in claim 1, wherein the step of assembling the outer structure and the body portion comprises securing the outer structure to the body portion using one of press-fitting, welding, spin-welding and gluing.

4. A method as claimed in claim 1, wherein the steps of providing the body portion and assembling the outer structure and the body portion comprise injection-moulding the body portion integrally with the outer structure.

5. A method as claimed in claim 1, which further comprises pre-fitting an applicator portion to the insert.

6. A method as claimed in claim 1, wherein the step of moulding the insert includes a step of integrally moulding an applicator portion with the insert.

7. A method as claimed in claim 1, wherein the weakened area is defined by a plurality of break-off ribs, with the step of moulding the outer structure comprising moulding the plurality of break-off ribs at a junction between the handle portion and shoulder portion.

8. A container and applicator arrangement for a cosmetic product, including:
- an insert made of a first material including an elongate stem having a proximal end and a distal end having an applicator portion;
- an outer structure made of a second material, the outer structure accommodating the insert so as to define a unitary structure, the outer structure defining a handle portion and a shoulder portion, and having a weakened area between the handle portion and the shoulder portion to enable the handle portion to be separated from the shoulder portion, said handle portion and said shoulder portion adhering to the first material forming the insert with a low level of adhesion which enables the separation of the insert from the shoulder portion; and
- a body portion extending from the shoulder portion of the outer structure for accommodating the cosmetic product.

9. A container and applicator arrangement as claimed in claim 8, wherein the applicator portion is fitted to the elongate stem.

10. A container and applicator arrangement as claimed in claim 8, wherein the weakened area is defined by a plurality of break-off ribs.

11. A container and applicator arrangement as claimed in claim 8, wherein the handle portion can be separated from the shoulder portion with an opening force of between 10 N.cm and 30 N.cm.

12. A container and applicator arrangement as claimed in claim 8, wherein the body portion is made from a multi-layer co-extruded tube sleeve.

13. A container and applicator arrangement as claimed in claim 8, wherein the first material is polyoxymethylene (POM) and the second material is a polyethylene (PET).

14. A container and applicator arrangement as claimed in claim 8, wherein the first material is a polyethylene and the second material is polypropylene (PP) including a slip additive.

15. A container and applicator arrangement as claimed in claim 8, wherein the first material is a copolyester and the second material is a polyethylene.

16. A container and applicator arrangement as claimed in claim 8, wherein the outer part includes an internal integrally moulded wiper element that snugly accommodates the insert.

17. A container and applicator arrangement as claimed in claim 16, wherein the wiper element comprises a lip for engaging an indent defined on the insert so as to sealingly engage the insert in a snap-fit when the insert is fitted to the outer structure.

18. A container and applicator arrangement as claimed in claim 8, wherein the insert includes a screw thread for engaging a complementary screw thread defined on an internal portion of the shoulder portion.

* * * * *